United States Patent
Liu

(10) Patent No.: US 9,650,920 B2
(45) Date of Patent: May 16, 2017

(54) METHOD OF GENERATING A HIGH-SPEED AIRFLOW

(75) Inventor: Angfeng Liu, Shandong (CN)

(73) Assignee: SHANDONG NATERGY ENERGY TECHNOLOGY CO., LTD., Shandong (CN)

(*) Notice: Subject to any disclaimer, the term of this patent is extended or adjusted under 35 U.S.C. 154(b) by 0 days.

(21) Appl. No.: 14/115,827

(22) PCT Filed: May 8, 2012

(86) PCT No.: PCT/CN2012/000615
§ 371 (c)(1),
(2), (4) Date: Nov. 5, 2013

(87) PCT Pub. No.: WO2012/152066
PCT Pub. Date: Nov. 15, 2012

(65) Prior Publication Data
US 2014/0174082 A1     Jun. 26, 2014

(30) Foreign Application Priority Data

May 8, 2011    (CN) .......................... 2011 1 0116942

(51) Int. Cl.
*F01K 13/00*     (2006.01)
*F01K 27/00*     (2006.01)
(Continued)

(52) U.S. Cl.
CPC .............. *F01K 27/00* (2013.01); *F01K 13/00* (2013.01); *F01K 21/04* (2013.01); *F01K 25/00* (2013.01);
(Continued)

(58) Field of Classification Search
CPC .......... F01K 27/00; F01K 21/04; F01K 25/00; F01K 25/04; F01K 25/08; F01K 25/10;
(Continued)

(56) References Cited

U.S. PATENT DOCUMENTS 4,455,834 A * 6/1984 Earle ...................... F01K 25/10
                                                              60/641.1
7,883,570 B2   2/2011 Obrejanu
(Continued)

FOREIGN PATENT DOCUMENTS

CN     1897168 A    7/2005
CN     1897168 A    1/2007
(Continued)

OTHER PUBLICATIONS

International Search Report for PCT/CN2012/000615, mailed Aug. 23, 2012, 2 pages.
CN Office Action for CN Application No. 201110116942.2, dated Aug. 5, 2013; 6 pages (with english translation).
CN Office Action for CN Application No. 201110116942.2, dated Jan. 2, 2014; 5 pages (with english translation).
(Continued)

*Primary Examiner* — Phutthiwat Wongwian
*Assistant Examiner* — Kelsey Stanek
(74) *Attorney, Agent, or Firm* — Schwabe, Williamson & Wyatt, P.C.

(57) ABSTRACT

Disclosed in the present invention is a method of generating a high-speed gas flow, utilizing a device comprised of a gas pipe, a circulating pipe and a starting and controlling system. The starting and controlling system is comprised of one or a combination of any two or more of a refrigerator, a circulating pump and a heat exchanger. The method comprises the following operation steps: filling the device with a working medium; activating the starting and controlling system; after having been pressurized under liquid state, the working medium absorbing heat and being gasified, entering the gas pipe, and generating the high-speed gas flow. The method may utilize a low quality heat source to convert a low-speed gas flow into a high-speed or extremely high-speed gas flow with relatively high use value. Thus, thermal energy carried by the fluid in the nature may be converted into mechanical energy efficiently.

8 Claims, 1 Drawing Sheet

(51) Int. Cl.
*F01K 21/04* (2006.01)
*F01K 25/00* (2006.01)
*F02C 1/10* (2006.01)
*F01K 25/08* (2006.01)

(52) U.S. Cl.
CPC ............... *F01K 25/08* (2013.01); *F02C 1/10* (2013.01); *F05D 2260/601* (2013.01)

(58) Field of Classification Search
CPC .......... F01K 13/00; F01K 21/047; F02C 1/10; F05D 2260/601
USPC ................................ 60/645, 671, 670, 605.1
See application file for complete search history.

(56) References Cited

U.S. PATENT DOCUMENTS

| | | | |
|---|---|---|---|
| 2008/0202121 A1* | 8/2008 | Nagel | F01K 21/047 60/670 |
| 2008/0252078 A1 | 10/2008 | Myers et al. | |
| 2009/0044535 A1* | 2/2009 | Shiao et al. | 60/671 |
| 2009/0120618 A1* | 5/2009 | Konig | 165/104.21 |
| 2010/0287920 A1* | 11/2010 | Duparchy | F01K 13/02 60/320 |

FOREIGN PATENT DOCUMENTS

| | | |
|---|---|---|
| CN | 201771558 U | 8/2010 |
| CN | 201771558 U | 3/2011 |
| CN | 202187805 U | 4/2012 |
| FR | 800835 A | 7/1936 |
| JP | H02173324 A | 7/1990 |
| JP | 2004353571 A | 12/2004 |
| JP | 2010242516 A | 10/2010 |
| WO | WO2006094324 A2 | 9/2006 |
| WO | WO2012152066 A1 | 11/2012 |

OTHER PUBLICATIONS

First Examination and Search Report mailed Jan. 23, 2015 for Canadian Application No. 2,834,949, 4 pages.
Notice of Allowance mailed Oct. 7, 2015 Canadian Application No. 2,834,949, 1 page.
First Examination Report mailed Mar. 16, 2015 for Australian Application No. 2012253132, 2 pages.
Second Examination Report mailed Jul. 14, 2015 for Australian Application No. 2012253132, 3 pages.
First Office Action mailed Sep. 2, 2015 for Colombian Application No. 13-263.122, 11 pages.
Decision of Rejection mailed Dec. 5, 2015 for Colombian Application No. 13-263.122, 8 pages.
Extended European Search Report mailed Jul. 7, 2015 for European Application No. 12782998.4, 5 pages.
First Office Action mailed Sep. 24, 2014 for Japanese Application No. 2014-508675, 8 pages.
First Office Action mailed Dec. 16, 2014 for Korean Application No. 10-2013-7032540, 8 pages.
First Office Action mailed Sep. 7, 2015 for Mexican Application No. Mx/a/2013/013052, 6 pages.
First Examination Report mailed Aug. 4, 2014 for New Zealand Application No. 616889, 1 page.
Substantive Examination Report mailed Sep. 22, 2015 for Philippines Application No. 10-2013-502233, 2 pages.
Notice of Acceptance mailed Mar. 18, 2015 for South African Application No. 2013109189, 1 page.
Second Office Action mailed Jan. 15, 2016 for Mexican Application No. Mx/a/2013/013052, 6 pages.
First Office Action mailed Dec. 2, 2015 for Eurasian Application No. 201391648, 6 pages.
Second Office Action mailed Jun. 2, 2016 for Eurasian Application No. 201391648, 4 pages.
Second Office Action mailed Jul. 2, 2016 for Colombian Application No. M13-263.122, 6 pages.
Third Office Action mailed Nov. 25, 2016 for Eurasian Application No. 201391648/31, 4 pages.

* cited by examiner

METHOD OF GENERATING A HIGH-SPEED AIRFLOW

FIELD OF THE INVENTION

The invention provides a method of generating a high-speed gas flow, belonging to a method of converting thermal energy or fluid energy into mechanical energy.

BACKGROUND OF THE INVENTION

In the prior art, a method of generating a high-speed gas flow is to firstly pressurize the gas and afterwards expand and eject the pressurized gas to generate the high-speed gas flow. The adoption of this method causes high energy consumption and great energy source waste; in addition, due to many aspects of restrictions such as pressure endurance of a mechanical device, tolerance of material on temperature, machine weight or dimensional requirement and the like, the generated gas flow is not in a very high speed and thus has relatively low use value.

The uppermost way of utilizing energy source by human beings is to convert thermal energy into mechanical work. A traditional conversion way is to firstly convert thermal energy into pressure potential energy and afterwards do work to the outside. However, this traditional conversion way produces energy loss and consumes fossil energy source additionally.

SUMMARY OF THE INVENTION

The invention is aimed to avoid shortcomings in the aforementioned prior art, and thus provides a method of utilizing a low quality heat source to convert a low-speed gas flow into a high speed or extremely high-speed gas flow with relatively high use value.

The invention is further aimed to convert the thermal energy carried by the fluid in the nature into mechanical energy efficiently by utilizing the method of generating a high-speed gas flow in the present invention.

Objectives of the invention can be achieved by taking the following measures:

The method of generating a high-speed gas flow of the invention is implemented by adopting a device comprised of a gas pipe 1, a circulating pipe 2 and a starting and controlling system 3. The starting and controlling system 3 is comprised of one or a combination of any two or more of a refrigerator 4, a circulating pump 5 and a heat exchanger 6; the method comprising the following operation steps:

① filling the device with a working medium;
② activating the starting and controlling system 3;
③ after having been pressurized under liquid state, the working medium absorbing heat and being gasified, entering the gas pipe 1, and generating the high-speed gas flow.

The gas pipe 1 is a key equipment for generating the high speed fluid. The designed shape of the gas pipe 1 can be adjusted according to different requirements of flow or flow rate. When temperature of the working medium in the gas pipe 1 is decreased due to high gas flow rate and accompanied by liquid condensed, the gas pipe 1 can make the liquid precipitate out by changing the shape of the gas pipe, etc.

The circulating pipe 2 is a common pipeline that can meet fluid transportation.

The setting of the starting and controlling system 3 is aimed to enable part of the working medium to absorb heat and to be evaporated to re-enter the gas pipe system after having been pressurized under liquid state. The starting and controlling system can play the roles of adjusting flow of the fluid, liquidizing the fluid, pressurizing the fluid, gasifying the fluid, heating the fluid, opening and closing the circulating pipe.

The refrigerator 4 in the starting and controlling system 3 can be selected and matched according to boiling point and circulation volume of the working medium.

The circulating pump 5 in the starting and controlling system 3 can be selected and matched according to gas-liquid phase condition and circulation volume of the working medium. The circulating pump is used for maintaining unidirectionality of the circulation and for pressurizing the liquidized fluid, so as to obtain a pressure difference required for generating high speed of the fluid in the gas pipe.

The heat exchanger 6 in the starting and controlling system 3 can be selected according to evaporation demand of the working medium and temperature difference condition of a heat exchange source.

The method of generating a high-speed gas flow of the invention comprises the starting process as follows:

Preparation for the starting:

A gaseous working medium with low boiling point exists in the gas pipe 1 and its inlet and outlet ends, and another kind of working medium with high boiling point exists in the circulating pipe 2; the working medium with high boiling point flows through the starting and controlling system.

Activating the circulation of the circulating pipe 2 and the gas pipe 1:

Firstly closing outer circulation inlet and outlet of the gas pipe 1, afterwards activating the circulating pump 5 and the refrigerator 4 in the starting and controlling system 3, liquidizing the working medium with low boiling point in the circulating pipe and transporting the liquid into the heat exchanger 6 via the circulating pump 5 to absorb heat and be evaporated. The gaseous working medium with low boiling point enters the gas pipe 1 after absorbing heat from the outside environment and flows at a high speed in the gas pipe 1, through the circulating pipe 2 and the starting and controlling system 3 to re-enter the gas pipe 1. In this way, the working medium with low boiling point is circulated rapidly between the circulating pipe 2 and the gas pipe 1, and at that time the diameter of the gas pipe 1 can be adjusted to increase gas flow rate.

Activating outer circulation of the gas pipe 1:

Slowly opening the outer circulation inlet and outlet of the gas pipe 1, to make the working medium with low boiling point in the outer circulation circulate directionally driven by the working medium with high boiling point from the circulating pipe 2. Due to the mass conservation of the circulative working medium with high boiling point, the adding of the circulative gaseous working medium with low boiling point will greatly accelerate linear speed of the fluid in the gas pipe, and will further greatly accelerate gas flow speed in the gas pipe by further narrowing ventilation diameter of the gas pipe 1.

Applying Load

Part or all of the working medium with high boiling point can be liquidized by accelerating flow speed and/or placing an energy consumption load equipment such as a steam turbine and so on into the circulation of the gas pipe. The liquidized working medium with high boiling point is guided into the circulating pipe 2 by a gas-liquid separation equipment and a flow guiding equipment such as a curve or a spiral or the like additionally provided in the gas pipe 1, and afterwards is anew circulated to enter the gas pipe 1 after absorbing heat by passing through the starting and controlling system 3.

In this way, a normal operating state is achieved, and a stable high-speed gas flow with extremely high speed is formed in the gas pipe 1.

By adding power load into the circulation of the gas pipe 1, energy consumption of the refrigerator 4 in the starting and controlling system 3 can be partially reduced or entirely eliminated, so as to achieve a power energy source system with an extremely high efficiency.

In the process of activating or operation, the circulating pump 5 is possible to be replaced by a circulation system of the refrigerator 4 or by gravity of the condensed liquid or an impulsive force from the gas pipe. For this reason, the circulating pump 5 is possible to be spared and not used, neither is the heat absorber 6 in the absence of sufficient outward energy output. The refrigerator 4 is also possible to be spared and not used as the energy taken away by the high-speed gas flow is sufficient to liquidize part of the working medium. However, this system must have an initial circulation power that comes firstly from circulation power of the circulating pump 5 or the refrigerator 4 of their own. The heat absorber 6 or the refrigerator 4 in themselves will be adjusted or selected upon different working conditions.

Sometimes the gas pipe 1 and the circulating pipe 2 can be completely combined into one pipeline in terms of the physical structure, but at that time the pipeline must have dual functions of both the gas pipe and the circulating pipe. This can be achieved in the manner of designing a liquid flow guiding groove or a backflow pipe and the like on the gas pipe, and in this case the flow guiding groove or the backflow pipe can also be regarded as the circulating pipe 2.

Besides, the objectives of the invention can be achieved by taking the following measures:

In the method of generating the high-speed gas flow of the invention, the gas pipe 1 makes the gaseous working medium be condensed into liquid state and be guided into the circulating pipe 2 by necking 8 the gas pipe 1 to vary the diameter thereof or by additionally providing the gas-liquid separation device and the flow guiding device 9 such as the curve or the spiral, afterwards the working medium is anew circulated to enter the gas pipe 1 after absorbing heat by passing through the starting and controlling system 3. This is a preferred technical solution.

In the method of generating the high-speed gas flow of the invention, the gas pipe 1 and the circulating pipe 2 are overlapped completely or partially, or in end-to-end connection. This is one technical solution of the invention.

In the method of generating the high-speed gas flow of the invention, the starting and controlling system 3 and the circulating pipe 2 are in series connection with each other. This is one technical solution of the invention.

The method of generating high-speed gas flow of the invention is characterized in that the gas flow discharged from the gas pipe 1 returns back to an inlet of the gas pipe to produce circulation.

The method of generating the high-speed gas flow of the invention is characterized in that the working medium flowing in the device is a fluid or a mixture of more than one fluid working mediums.

In the method of generating the high-speed gas flow of the invention, air or water is adopted as the fluid working medium in the gas pipe 1. This is a preferred technical solution.

In the method of generating the high-speed gas flow of the invention, an inlet and an outlet of the gas pipe 1 are all communicated to atmosphere. The circulating pipe 2 is filled with water. A high-speed airflow is generated in the gas pipe by forced circulation and liquefaction in the starting and controlling system 3. As the water in the high-speed airflow is at a low temperature in a high speed state, most of water vapor is liquidized to enter the circulating pipe 2, and the air in the gas pipe is further accelerated under a driving force from the water vapor, and the high-speed airflow is discharged into the atmosphere. The water in the circulating pipe absorbs heat from the natural environment by the heat absorber and is evaporated to re-enter the gas pipe 1 for circulation. A small part of water discharged into the atmosphere will be naturally supplemented by the water vapor in nature air via the inlet of the gas pipe, to form a water balance.

The application of the method of generating the high-speed gas flow of the invention is characterized in that the method is applied to an engine system and other devices using a high-speed gas flow.

The method of generating the high-speed gas flow disclosed in the invention has prominent and substantive features and represents notable technical progresses over the prior art as follows:

1. Provided is a method of utilizing a low quality heat source to convert a low-speed gas flow into a high-speed or extremely high-speed gas flow with relatively high use value.

2. By utilizing the method of generating the high-speed gas flow in the present invention, the thermal energy carried by the fluid in the nature is converted into mechanical energy efficiently.

3. Provided is a device that can directionalize undirectional thermal motion of gas molecules directly to be converted into the high-speed gas flow by avoiding the process of significant pressurization to the best extent and utilizing a low quality heat source.

4. The extremely high-speed gas flow that is very difficult to generate by the method of pressurization can be generated.

5. The extremely high energy gas flow can be generated by utilizing a relatively simple device.

In the figures:
1—gas pipe;
2—circulating pipe;
3—starting and controlling system;
4—refrigerator;
5—circulating pump;
6—heat absorber;
7—power consumption device;
8—gas pipe necking; and
9—gas-liquid separation device and flow guiding device.

DETAILED DESCRIPTION OF THE EMBODIMENTS

Hereinafter the invention will be further described in details incorporating examples.

Example 1

Figure 1:
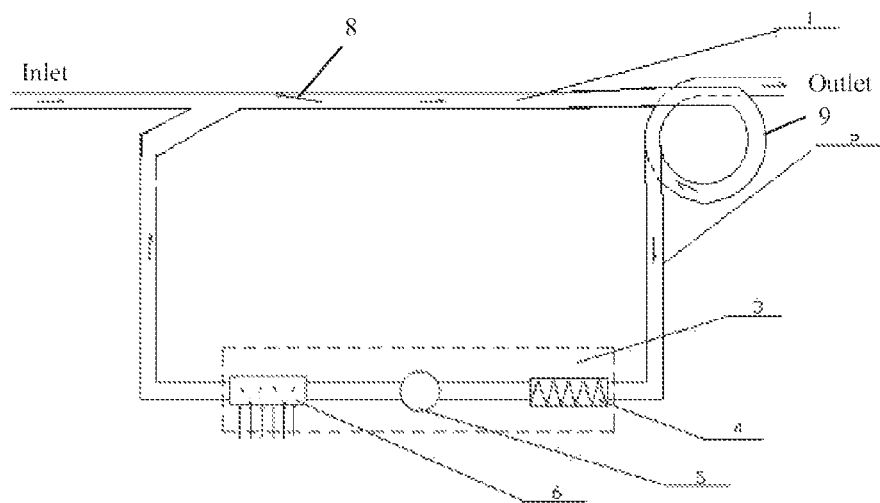
FIG. 1 is a schematic diagram of a principle of the device implementing the method of generating a high-speed gas flow of the invention.
Figure 2:
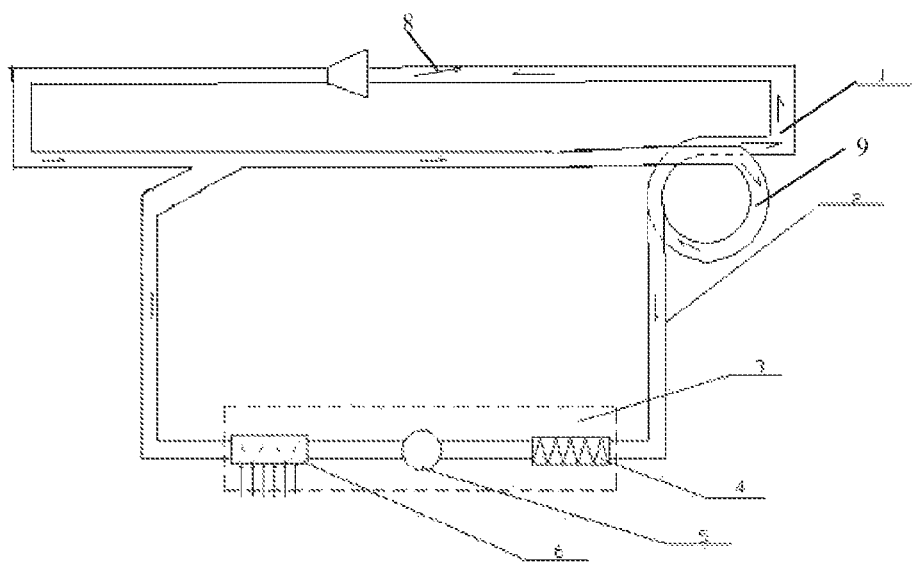
FIG. 2 is a schematic diagram of a principle of conducting a power drive via the high-speed gas flow generated by employing the method of the invention.

The method of generating a high-speed gas flow of the invention is implemented by utilizing a device comprised of an gas pipe 1, a circulating pipe 2 and a starting and controlling system 3, wherein the gas pipe 1 is filled with air and is in end-to-end connection (see FIG. 2), a steam turbine 7 is mounted on the gas pipe 1, and the air in the gas pipe 1 can pass through the steam turbine 7 to do work. The circulating pipe is filled with refrigerant R134a (or other working medium with atmospheric boiling point lower than environmental temperature). High-speed R134a gas flow is generated in the gas pipe by forced circulation and liquefaction in the starting and controlling system 3. As the R134a (or other working medium with atmospheric boiling point lower than environmental temperature) in the high-speed gas flow is at a low temperature in a state of high speed, part or all of the R134a is liquidized to enter the circulating pipe 2, and at the same time the air in the gas pipe is further accelerated under a driving force from the high-speed R134a (or other working medium with atmospheric boiling point lower than environmental temperature) and drives the steam turbine to rotate to do and output work to the outside, so that the energy system of the overall system is decreased and the temperature is lowered. The R134a (or other working medium with atmospheric boiling point lower than environmental temperature) in the circulating pipe can absorb heat from the natural environment by the heat absorber and is evaporated to re-enter the gas pipe 1 for circulation, so that the energy system of the overall system is maintained at a balanced level. The adjustment of parameters of the starting and controlling system 3 can reduce working frequencies or stop the working of the refrigerator 4 and the circulating pump 5 in the starting and controlling system 3, and can ensure an automatic circulation of the overall system as well as an automatic operation of the processes of absorbing heat and doing work.

Example 2

The method of generating the high-speed gas flow of the invention is implemented by utilizing a device comprised of the gas pipe 1, the circulating pipe 2 and the starting and controlling system 3 (see FIG. 2), wherein the gas pipe 1 in itself can be in end-to-end connection to form a pipeline passage, in which only one kind of working medium exists, so that the overall circulation can be activated by activating the refrigerator and the circulating pump in the starting and controlling system 3, but in this case the working medium is only partially liquidized at a high speed, non-liquidized part of the working medium is remained to be circulated at a high speed in the gas pipe 1, in such a way the using effect of example 1 can also be achieved.

Example 3

The method of generating the high-speed gas flow of the invention is implemented by utilizing a device comprised of the gas pipe 1, the circulating pipe 2 and the starting and controlling system 3 (see FIG. 2), wherein an inlet and an outlet of the gas pipe 1 are all communicated to atmosphere. The circulating pipe is filled with water (or other working medium with atmospheric boiling point lower than environmental temperature). A high-speed airflow is generated in the gas pipe by forced circulation and liquefaction in the starting and controlling system 3. As the water in the high-speed airflow is at a low temperature in a high speed state, most of the water (or other working medium with atmospheric boiling point lower than environmental temperature) is liquidized to enter the circulating pipe 2, and the air in the gas pipe is further accelerated under a driving force from water vapor (or other working medium with atmospheric boiling point lower than environmental temperature), and the high-speed airflow is discharged into the atmosphere. The water (or other working medium with atmospheric boiling point lower than environmental temperature) in the circulating pipe can absorb heat from the natural environment by the heat absorber and is evaporated to re-enter the gas pipe 1 for circulation. A small part of water discharged into the atmosphere will be naturally supplemented by the water vapor in nature air via the inlet of the gas pipe, to form a water balance.

What is claimed is:

1. A method of generating a high-speed gas flow, in natural environment, that involves utilizing a device comprising a gas pipe, a circulating pipe, a guide pipe, and a starting and controlling system,
    wherein the starting and controlling system comprises a refrigerator, a circulating pump, and a heat exchanger; wherein the gas pipe makes a working medium in gaseous state be condensed into liquid state and be guided into the circulating pipe by necking the gas pipe to vary the diameter thereof or by additionally providing a gas-liquid separation device and a flow guiding device; wherein the guide pipe guides the working medium in gaseous state from the circulating pipe into the gas pipe in a direction toward an outlet of the gas pipe, wherein the working medium is anew circulated to enter the gas pipe after absorbing heat by passing through the starting and controlling system; and wherein the method comprises:
    filling the device with the working medium;
    activating the starting and controlling system; and
    after having been pressurized under liquid state, the working medium absorbing heat from the natural environment and being gasified, and entering the gas pipe, to generate the high-speed gas flow.

2. The method of generating a high-speed gas flow according to claim 1, characterized in that the gas pipe and the circulating pipe are overlapped completely or partially, or in end-to-end connection.

3. The method of claim 1, characterized in that the starting and controlling system and the circulating pipe are in series connection with each other.

4. The method of claim 1, characterized in that the gas flow discharged from the gas pipe returns back to an inlet of the gas pipe to produce circulation.

5. The method of claim 1, characterized in that the working medium flowing in the device is a fluid or a mixture of more than one fluid.

6. The method of claim 1, characterized in that air or water is adopted as the working medium in the gas pipe.

7. The method of claim 1, characterized in that an inlet and an outlet of the gas pipe are all communicated to atmosphere; that the circulating pipe is filled with water; that a high-speed airflow is generated in the gas pipe by forced circulation and liquefaction in the starting and controlling system; wherein as the water in the high-speed airflow is at a low temperature in a state of high speed, some of water vapor is liquidized to enter the circulating pipe, and air in the gas pipe is further accelerated under a driving force from the water vapor, and the high-speed airflow is discharged into the atmosphere; and wherein the water in the circulating pipe absorbs heat from the environment by a heat absorber and is evaporated to re-enter the gas pipe for circulation; and that a portion of water discharged into the atmosphere is to be supplemented by the water vapor in incoming air via the inlet of the gas pipe, to form a water balance.

8. The method of claim 1, characterized in that the method is applied to an engine system.

* * * * *